Sept. 27, 1927.  
P. GOODMAN  
1,643,886  
FITTING FOR GAS PRESSURE GAUGES  
Filed Feb. 23, 1927
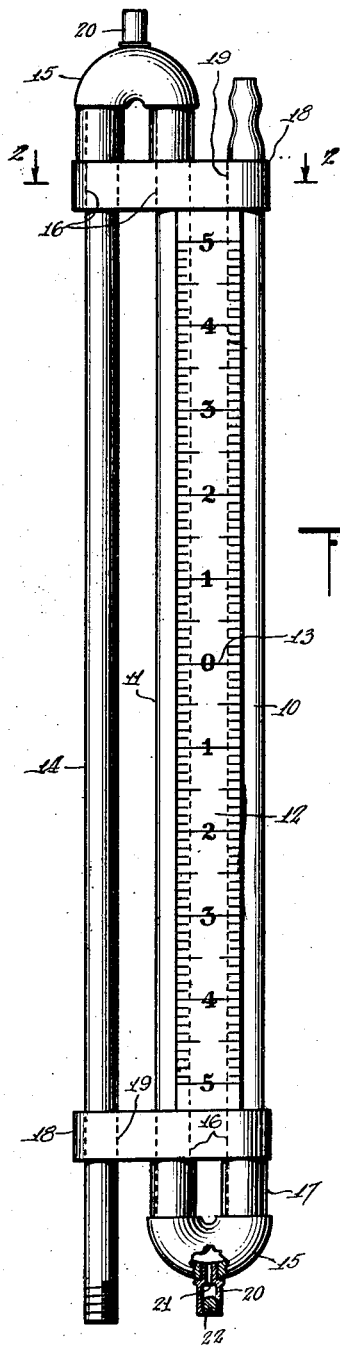
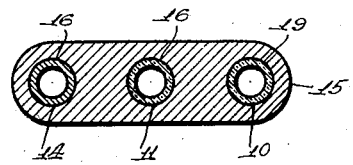
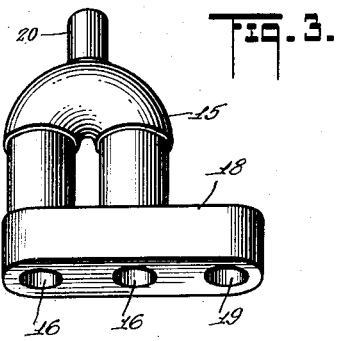
INVENTOR  
*Patrick Goodman.*  
BY  
ATTORNEY Patented Sept. 27, 1927.

1,643,886

UNITED STATES PATENT OFFICE.

PATRICK GOODMAN, OF BROOKLYN, NEW YORK.

FITTING FOR GAS-PRESSURE GAUGES.

Application filed February 23, 1927. Serial No. 170,378.

My invention relates to gas pressure gauges adapted to make connection with a gas pipe to ascertain the pressure therein. The invention particularly relates to a gas pressure gauge employing two gauge glasses parallel with each other and connected by a U-shaped fitting.

The general object of my invention is to provide a gauge of the indicated type improved in various particulars, more especially with relation to the means for connecting the glass gauges with each other at the bottom and connecting one of the gauge glasses with a gas connection pipe, as well as to provide means forming at the bottom a girth or tie between the glasses and the gas pipe, and at the top forming a girth between the two gauge glasses.

A further important object of the invention is to provide the same form of fitting for the top and bottom of the gauge, so that one fitting will connect both the tubes and the gas pipe at the top and the bottom.

The invention also has for an important object to provide a fitting which will afford a flexible connection between the pair of gauge glasses and the gas pipe, in the first place to prevent breakage, and in the second place to adapt the gas pipe to be disposed in a plane at an angle to the plane of the gauge glasses or in the same plane with the gauge glasses.

Reference is to be had to the accompanying drawings forming a part of this specification, it being understood that the drawings are merely illustrative of one example of the invention.

Figure 1 is a side elevation of a gas pressure gauge embodying my invention.

Figure 2 is an enlarged transverse section on the line 2—2 of Figure 1.

Figure 3 is a perspective view of the fitting employed at both ends of the pressure gauge.

In carrying out my invention in accordance with the illustrated example, the gauge glasses 10, 11 are maintained in parallel relation by the usual graduated strip 12, the graduations of which run upwardly and downwardly from an approximately medial zero mark, 13. The numeral 14 indicates a gas pipe to be tapped into or otherwise connected with the gas pipe, the gas pressure of which is to be ascertained. The gauge glasses 10 and 11 and the gas pipe 14 are attached to the fixtures 15 hereinafter described by a tight fitting slip joint.

My improved fitting designated generally by the numeral 15 and shown best in Figure 3 is employed at both the top and bottom of the pressure gauge. Each fitting is provided with a pair of parallel holes 16 and the fitting at the holes is provided with a U-shaped element 17 in register with the pair of holes 16, and thereby establishing in the one instance, communication between the lower end of the gauge glasses 10, 11 and establishing, in the other instance at the top of the gauge, communication between the gas pipe 14 and the adjacent pressure glass 11.

Each fitting also has a lateral member 18 provided with a hole 19 parallel with the holes 16.

The fitting disposed at the bottom of the gauge embraces the gas pipe 14 at the hole 19, said gas pipe passing through said hole. At the top the hole 19 of the fitting 15 embraces the terminal portion of one gauge glass 10, said gauge glass passing through said hole. In the one instance, therefore, the fitting designated 15 forms a girt or tie between that portion of the fitting embracing the two gauge glasses and that member 18 forming connection with the gas pipe 14. At the top the member 18 forms a tie between the two gauge glasses. That portion of the material of the fitting 15 uniting the member 18 to the portion having the parallel holes 16 is flexible, said fitting being formed of rubber. The result is that in the use of the pressure gauge the fittings 15 yield to distorting strains and breakage is prevented. Moreover, the flexibility permits of the gauge being disposed in what are ordinarily inaccessible places because the gas pipe 14 may be brought out of the same plane with the gauge glasses 10 and 11 and disposed in a plane at an angle to said first mentioned plane.

Each fitting 15 at the U bend thereof is provided with a device 20 which serves either as a drain for the bottom fitting or a vent for the fitting disposed at the top of the gauge. Said device 20 has a longitudinal fluid passage 21 and a screw plug 22 closing the end thereof and adapted to be removed for draining or venting the fitting.

I would state furthermore that while the illustrated example constitutes a practical embodiment of my invention, I do not limit myself strictly to the exact details herein illustrated, since, manifestly, the same can be considerably varied without departure from the spirit of the invention, as defined in the appended claims.

What I claim is:

1. A pressure gauge comprising tubular gauge elements and a gas pipe adapted for connection with the pipe the pressure in which is to be ascertained, together with a flexible fitting at opposite ends of the gauge, said fittings forming a tie between the gauge elements and the gas pipe.

2. A fluid pressure gauge including tubular gauge elements, a gas pipe and a fitting establishing communication between said gauge elements at one end, that fitting which establishes communication between the gauge elements constituting also a tie between the gas pipe and the adjacent gauge element, as well as a similar fitting at the opposite end of the gauge elements and establishing communication between the gas pipe and one gauge element, and constituting a tie between the gauge elements.

3. A fitting for gas pressure gauges having means to receive a pair of gauge glasses and a lateral member adapted to receive a gas pipe; together with a device on said fitting adapted to constitute either a drain or a vent according to its position at the top or bottom of the gauge.

4. A fluid pressure gauge including tubular gauge elements, a gas pipe and a fitting of flexible material establishing communication between said gauge elements at one end, that fitting which establishes communication between the gauge elements constituting also a tie between the gas pipe and the adjacent gauge element, as well as a similar fitting at the opposite end of the gauge elements and establishing communication between the gas pipe and one gauge element, and constituting a tie between the gauge elements; the flexible material of the fitting permitting flexure of the fitting between the gas pipe and the adjacent gauge element.

5. A fitting for gas pressure gauges having approximately two parallel holes therethrough, a U-shaped member establishing communication between said holes, and an end member having also a hole, the two holes first mentioned being adapted to receive gauge glasses and the third hole being adapted to receive a gas pipe.

6. A fitting for gas pressure gauges formed of flexible rubber, having approximately two parallel holes therethrough, a U-shaped member establishing communication between said holes, and an end member having also a hole, the two holes first mentioned being adapted to receive gauge glasses and the third hole being adapted to receive a gas pipe.

PATRICK GOODMAN.